(12) United States Patent
Boon

(10) Patent No.: US 11,772,992 B2
(45) Date of Patent: Oct. 3, 2023

(54) DEIONIZATION DEVICE AND METHOD FOR AT LEAST PARTIALLY DEIONIZING A FEED LIQUID IN WHICH AN ELECTROLYTE IS DISSOLVED, AND APPARATUSES USING SUCH DEVICES

(71) Applicant: AVSALT AB, Malmö (SE)

(72) Inventor: Nicolaas Jacobus Henricus Boon, Malmo (SE)

(73) Assignee: AVSALT AB, Lund (SE)

( * ) Notice: Subject to any disclaimer, the term of this patent is extended or adjusted under 35 U.S.C. 154(b) by 354 days.

(21) Appl. No.: 16/982,468

(22) PCT Filed: Mar. 21, 2019

(86) PCT No.: PCT/EP2019/057102
§ 371 (c)(1),
(2) Date: Sep. 18, 2020

(87) PCT Pub. No.: WO2019/180151
PCT Pub. Date: Sep. 26, 2019

(65) Prior Publication Data
US 2021/0078877 A1    Mar. 18, 2021

(30) Foreign Application Priority Data

Mar. 21, 2018  (NL) .................................. NL2020640

(51) Int. Cl.
*C02F 1/469* (2023.01)
*C02F 1/461* (2023.01)
*B01J 49/30* (2017.01)

(52) U.S. Cl.
CPC ............. *C02F 1/4695* (2013.01); *B01J 49/30* (2017.01); *C02F 2001/46161* (2013.01); *C02F 2201/4611* (2013.01); *C02F 2201/4617* (2013.01)

(58) Field of Classification Search
CPC .................... C02F 1/469; C02F 1/4695; C02F 2001/46161; C02F 2201/4611;
(Continued)

(56) References Cited

U.S. PATENT DOCUMENTS

| | | | |
|---|---|---|---|
| 6,346,187 B1* | 2/2002 | Tran .................. | B82Y 30/00 |
| | | | 205/342 |
| 2006/0049105 A1* | 3/2006 | Max ................... | B01D 57/02 |
| | | | 210/243 |

(Continued)

FOREIGN PATENT DOCUMENTS

| | | |
|---|---|---|
| JP | 2002336864 A | 11/2002 |
| JP | 2005181190 A | 7/2005 |

(Continued)

OTHER PUBLICATIONS

Wang et al, "Three-dimensional macroporous graphene architectures as high performance electrodes for capacitive deionization", Jul. 25, 2013, Journal of Materials Chemistry A, vol. 1, p. 11778-11789 (Year: 2013).*

(Continued)

*Primary Examiner* — Luan V Van
*Assistant Examiner* — Andrew Koltonow
(74) *Attorney, Agent, or Firm* — DINSMORE & SHOHL LLP

(57) ABSTRACT

A deionization device is for at least partially deionizing a feed liquid in which at least one electrolyte is dissolved. The device has at least one process channel with a feed inlet for receiving the feed liquid, and a feed outlet; one or more collector channel(s) for collecting the anions and cations separated from the feed liquid; an electrolyte outlet for discharging the collected anions and cations; and at least one channel electrode, at least one separating electrode, and at least one collector electrode. The channel and separating electrodes are placed at opposite sides of the process channel, and the separating and collector electrodes are placed at opposite sides of the collector channel(s). A field generator generates an electric and/or magnetic field between the channel and separating electrodes, and between the separating and collector elec-
(Continued)

trodes, to generate an ion flow from the process to the collector channel(s), which is the same for anions and cations.

20 Claims, 8 Drawing Sheets

(58) Field of Classification Search
CPC ..... C02F 2201/4613; C02F 2201/4617; B01D 61/46; B01D 61/422; B01D 61/4281; B01J 49/30
See application file for complete search history.

(56) References Cited

U.S. PATENT DOCUMENTS

| | | | |
|---|---|---|---|
| 2010/0140092 A1* | 6/2010 | Volkel | C02F 1/4695 204/522 |
| 2014/0374258 A1 | 12/2014 | Hui | |
| 2016/0130161 A1* | 5/2016 | Eaton | C02F 1/48 204/229.5 |
| 2020/0399149 A1* | 12/2020 | Kim | B01D 61/42 |

FOREIGN PATENT DOCUMENTS

| | | |
|---|---|---|
| JP | 2011041940 A | 3/2011 |
| JP | 2013500158 A | 1/2013 |
| WO | 2006039873 A1 | 4/2006 |
| WO | 2018048180 A1 | 3/2018 |

OTHER PUBLICATIONS

International Search Report dated May 14, 2019; International Application No. PCT/EP2019/057102.

* cited by examiner

DEIONIZATION DEVICE AND METHOD FOR AT LEAST PARTIALLY DEIONIZING A FEED LIQUID IN WHICH AN ELECTROLYTE IS DISSOLVED, AND APPARATUSES USING SUCH DEVICES

CROSS-REFERENCE TO RELATED APPLICATIONS

This application is the U.S. national stage of PCT/EP2019/057102 filed Mar. 21, 2019, which claims priority of Netherlands Patent Application 2020640 filed Mar. 21, 2018 both of which are hereby incorporated by reference in their entirety.

FIELD OF THE INVENTION

This invention relates to deionization devices and methods for at least partially deionizing a feed liquid in which an electrolyte is dissolved, and apparatuses using such devices.

BACKGROUND OF THE INVENTION

For several types of liquids with electrolytes dissolved therein, deionization technologies are known. For example, reverse osmosis is a known purification technology that uses a semipermeable membrane to remove ions from a liquid solvent, such as water. Reverse osmosis works by applying a pressure to the solvent, which overcomes the osmotic pressure and pushes the solvent through a membrane that is not permeable to the electrolytes to be removed. Reverse osmosis can remove many different electrolytes and is widely used. For desalination of water for instance, i.e. the partial removal of dissolved salts, such as NaCl and KCl, reverse osmosis is the dominant technology.

Capacitive de-ionization or CDI is another known technology for removing ions which uses a set of porous electrodes that absorb ions when a voltage is applied. The CDI process is schematically illustrated in FIG. 1. The porous electrodes 131,132 are on either side of the channel, and a solution 2 of solvent and electrolytes, e.g. saline water, flows between them through the channel. During step (A) a DC voltage is applied over the electrodes 131,132, which will lead to a migration of negative ions 3 towards the positive electrode 132 and a migration of positive ions 4 to the negative electrode 131. The resulting formation of an 'ionic double layer' at the surface of the electrodes 131,132 depletes ions from the solution that flows between the electrodes. The outflowing stream thus has a lower concentration of ions, e.g. of salt, and this dilute stream can be collected as a product stream at an outlet 11, up till the point in time the electrodes are fully saturated with ions and cannot absorb more ions.

Once fully saturated, a regeneration of the electrodes 131,132 is required, as illustrated with B in FIG. 1. To regenerate the electrodes, the electrodes are either short-circuited or the polarity reversed which results in releasing the absorbed ions into the solution. As the ions are freed, the device produces a waste stream or concentrate with a higher ion concentration than the inflowing solvent. By diverting this waste stream to another outlet 15, mixing of the waste stream and the product stream produced in A can be prevented.

However, this inevitable regeneration results in efficiency losses. It also requires a mechanical intervention (i.e. a valve or switch) that enables diverting the product stream and the waste stream to different outlets 11 resp. 15. In addition, regeneration may require a significant amount of time (up to about 50%), during which the removal process is halted.

US 2016/0130161 describes an apparatus for separating salts from a liquid solution, WO 2006/039873 describes a device for desalination of seawater, and US 2014/0374258 describes a system for desalination.

Despite the advances, there is a need for simpler, more efficient and flexible, as well as more cost-efficient, deionization devices.

SUMMARY OF THE INVENTION

The present invention provides devices, apparatuses and methods as described herein.

Specific embodiments of the invention are also set forth herein.

These and other aspects of the invention will be apparent from and elucidated with reference to the embodiments described hereinafter.

A first aspect of the invention relates to a deionization device for at least partially deionizing a feed liquid in which at least one electrolyte is dissolved, the device comprising:
  at least one process channel (12) having a feed inlet configured for receiving the feed liquid, and a feed outlet configured for discharging the deionized feed liquid, such that the process channel comprises a feed liquid flow (L),
  one or more collector channel(s) (14,140,141,142) configured for collecting the anions and cations separated from the feed liquid,
  an electrolyte outlet (15) configured for discharging the collected anions and cations,
  at least one channel electrode (131), at least one separating electrode (132), and at least one collector electrode (133),
  wherein the channel electrode and the separating electrode are placed at opposite sides of the process channel, and wherein the separating electrode and the collector electrode are placed at opposite sides of the collector channel(s),
  a field generator (13) for generating an electric and/or magnetic field between the channel electrode and separating electrode, and between the separating electrode and the collector electrode,
wherein the field is adapted for generating an ion flow (l) from the process channel to the collector channel(s), and wherein the ion flow direction is the same for anions and cations.

In a preferred embodiment, the field generator generates an electric field, such as a potential or voltage difference between the electrodes.

A second aspect of the invention relates to use of the device according to the first aspect as an electrolyte extraction apparatus for separating different types of electrolytes from a liquid, or as a desalination apparatus for seawater, or as a decontamination apparatus for decontaminating liquids contaminated with toxic or radioactive electrolytes, or as an electrolytic recovery apparatus for recovering metals from a liquid.

A third aspect of the invention relates to a method for partially deionizing a feed liquid in which an electrolyte is dissolved, comprising the steps of:
  providing the device according to the first aspect,
  receiving the feed liquid at the feed inlet,
  passing the feed liquid through the process channel,
  generating an electric and/or magnetic field in the process channel, whereby the anions and cations of the electrolyte is driven in an ion flow direction which differs from the feed liquid flow direction and which is the same for both anions and cations, collecting the anions and cations at the collector channel, discharging the deionized feed liquid at the feed outlet, and discharging the collected anions and cations at the electrolyte outlet.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the FIGs. are illustrated for simplicity and clarity and have not necessarily been drawn to scale.

DETAILED DESCRIPTION OF THE PREFERRED EMBODIMENTS

Figure 1:
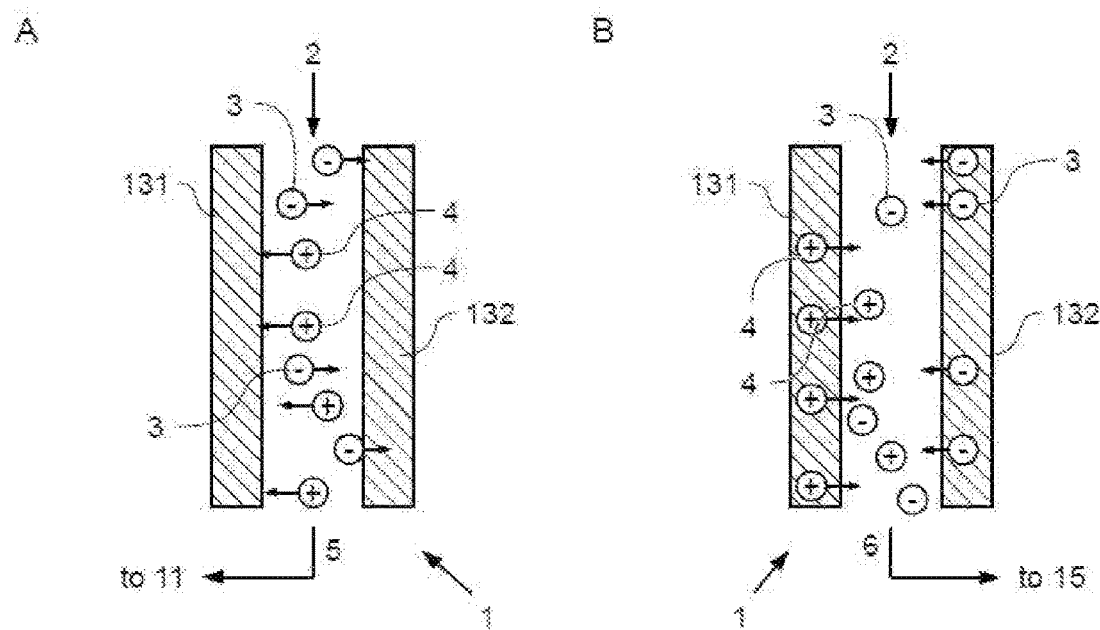
FIG. 1 shows a schematic diagram of an example of a prior art capacitive deionization for CDI device.

The invention is described below with the help of the accompanying figures. It would be appreciated by the people skilled in the art that the same feature or component of the device are referred with the same reference numeral in different figures. A list of the reference numbers can be found at the end of the detailed description section.

In the following, details will not be explained in any greater extent than that considered necessary for the understanding and appreciation of the underlying concepts of the present invention and in order not to obfuscate or distract from the teachings of the present invention.

Device

Figure 2:
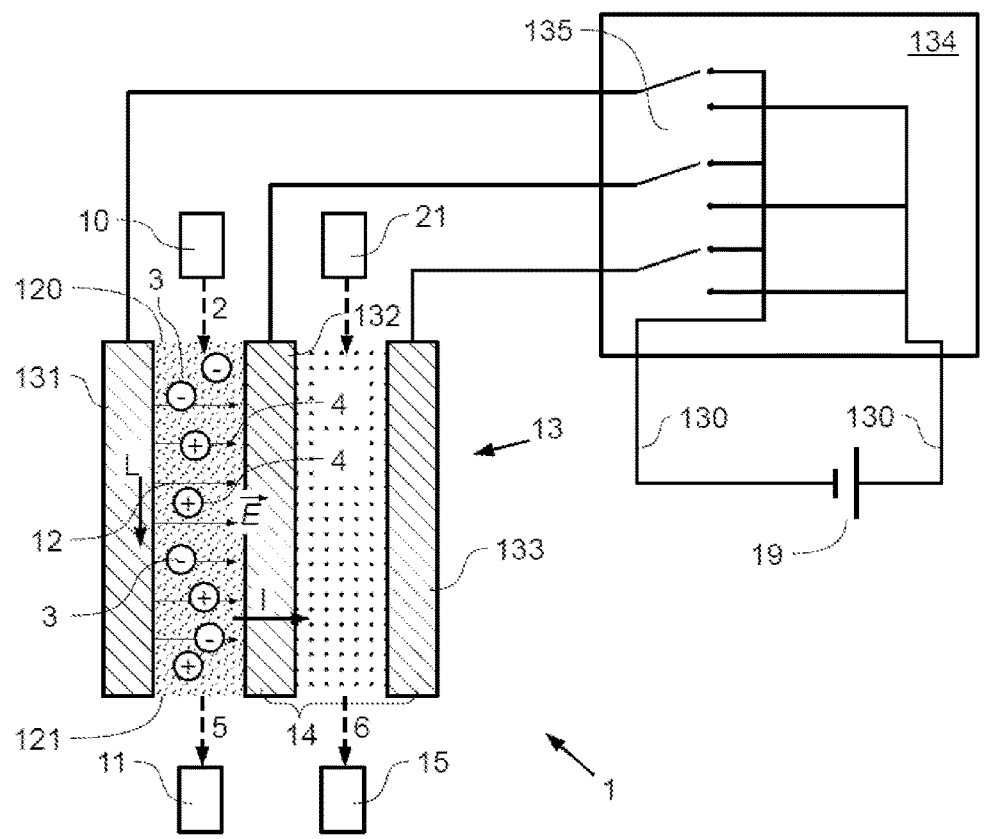
FIG. 2 shows a schematic diagram of an example of a deionization device according to the present invention.

Referring to FIG. 2, the example of a deionization device 1 shown therein can be used to, at least partially, deionize a feed liquid 2 in which one or more electrolytes, of which ions 3,4 are shown, are dissolved. For instance, one or more types of salts and/or acids and/or bases may be dissolved in the liquid 2. The solution may for example comprise different electrolytes, such as NaCl, KCl. The deionization device 1 comprises a feed inlet 10 and a dilute outlet 11. At the feed inlet 10 the feed liquid 2 can be received, e.g. when the feed inlet is connected to a suitable supply of the feed liquid 2 upstream of the inlet 10. At the dilute outlet 11 a diluted liquid 5 with a lower concentration of ions 3,4 of the electrolyte than the feed liquid 2 can be discharged, for example to further processing equipment (not shown in FIG. 1) downstream of the dilute outlet 11. The deionization device 1 further comprises a process channel 12 connected at an upstream side 120, in a liquid flow direction L of the feed liquid 2, to the feed inlet 10 and at a downstream side 121 to the dilute outlet 11.

The device 1 comprises a field generator 13 and a collector 14 located downstream, in the ion flow direction, of the process channel. An electrolyte outlet 15 is connected to the collector 14.

When in operation, the field generator 13 generates an electric and/or magnetic field $\vec{E}$ in the process channel 12 which drives anions 3 and cations 4 of the electrolyte in an ion flow direction I which differs from the liquid flow direction L and which is the same for both anions and cations. The collector 14 collects the anions and cations driven outside the process channel. At the electrolyte outlet, the collected anions and cations can then be discharged separately from the diluted liquid 5, in this example as a stream of concentrate liquid 6 which flows to the outlet 15.

The field drives both anions 3 and cations 4 of the electrolyte in the same ion flow direction I, and drives them out of the process channel, thus separating them from the feed liquid in the process channel. The process does therefore not need to be halted to release captured ions from the electrodes in the process channel, and the deionization can be performed in a (semi-)continuous manner. This enables for easy separation of the electrolyte and the dilute liquid streams.

Additionally, the need to foresee in mechanical parts to keep the paths of the electrolyte discharge and the dilute liquid separated is obviated as well. The number of mechanical components can thus be reduced, and for example an all-electric (except for the flow of feed liquid) deionization device be made, without the need for regeneration of the electrodes. This is confirmed experiments in which with even with a rudimentary setup saline water was treated to produce water with a lower salinity without mechanical intervention being needed to run the deionization device continuously for multiple hours. The possibility to reduce, or completely remove, the mechanical components further allows to make a durable and low-cost deionization device, which is particularly but not exclusively interesting for desalination of saline water to produce drinking water. Also, the deionization device can be scaled to any desired output volume and can therefore be particularly advantageous for the production of smaller volumes, for example of desalinated water, such as less than 1000 l/day, e.g. less than 500 l/day, e.g. for instance less than 50 l/day, e.g. less than 10 l/day. Such can e.g. be used for the desalination of water consumed by a household such as for drinking water.

Electrolyte Ions

The collected anions and cations can be discharged in any desired form. For example, the ions may be discharged when dissolved in a suitable solvent, such as a concentrate liquid 6 in which the concentration of electrolyte (e.g. in mass and/or ppm and/or volume) is higher than in the diluted liquid 5, and in addition higher than in the feed liquid 2. However, they may also be discharged dissolved in a liquid in which the concentration is lower or equal to the feed liquid, such as lower or equal to the dilute liquid.

The collected ions can be discharged dissolved in a liquid which is the same as the feed liquid or another suitable type of liquid solvent. For instance, the feed liquid may be an aqueous solution and the electrolyte solvent an organic liquid or an aqueous liquid. Likewise, the feed liquid may be an aqueous solution and the electrolyte solvent be water, such as demineralized water or drinking water.

Field Generator

The field generator 13 and the field may be implemented in any manner suitable for the specific implementation. The field may for example be a variable field which, during the deionization of the feed liquid, varies in the process channel 12 over time in one or more of the group consisting of: polarity, strength, direction. For instance, the field may change polarity or reverse direction over time according to a predetermined cycle of phase, as explained below.

In the deionization device of the example of FIG. 2, the field $\vec{E}$ is an electric field and the field generator 13 comprises electric contacts 130 connectible to an electrical power source 19, such as a DC power source. At opposite sides of the process channel 12, electrodes 131-132 are located which are connected to the electrical contacts 130. The electrodes 131,132 face each other and when electric power is provided by the power source 19, the electric field is generated between the electrodes 131,132. The field generator further comprises an electronic control circuit 134 which in operation controls the electric field, e.g. by switching the electrodes in a suitable sequence. In this example, the control circuit is connected to the electric contacts and the electrodes and the control circuit controls parameters of the electrodes which regulate the electric field.

As shown in FIG. 2, the field generator 13 may comprise different sets of electrodes. For example a first set of electrodes 131,132 which allows to generate the electric field in the process channel 12, and a second set of electrodes 132,133 which allows to generate an electric field in the collector 14.

In the example of FIG. 2, the electrodes comprise a channel electrode 131, a separating electrode 132 and a collector electrode 133. As shown, the collector electrode 133 is located in the collector at a distance from the separating 132. By applying a suitable voltage between the channel electrode 131 and the separating electrode 132 a field can be generated in the process channel 12 and by applying a suitable voltage between the collector electrode 133 and the separating electrode 132 a field can be generated in the collector. The field in the collector 14 e.g. can be used to drive the anions and/or cations driven into the collector in a direction away from the process channel 12 and/or to attract anions and/or cations of the electrolyte to be removed into the collector.

The process channel and the collector may be implemented in any manner suitable for the specific implementation. Still referring to FIGS. 2 and 3, as shown, the deionization device 1 may comprise a separation between the process channel 12 and the collector 14. The separation provides a relatively higher flux for the anions and cations than for the liquid and allows the anions and cations to pass from a process channel 12 side of the separation to a collector 14 side of the separation. In the deionization device 1 of the present example, the collector 14 comprises a collector channel 140 (see also FIG. 7) connected at a downstream, in a concentrate flow direction, side to the electrolyte outlet 15. The separation separates the collector channel 140 from the process channel 12. In the deionization device 1 of the present example, for instance, the separation comprises the separating electrode 132.

Electrodes

Figure 3:
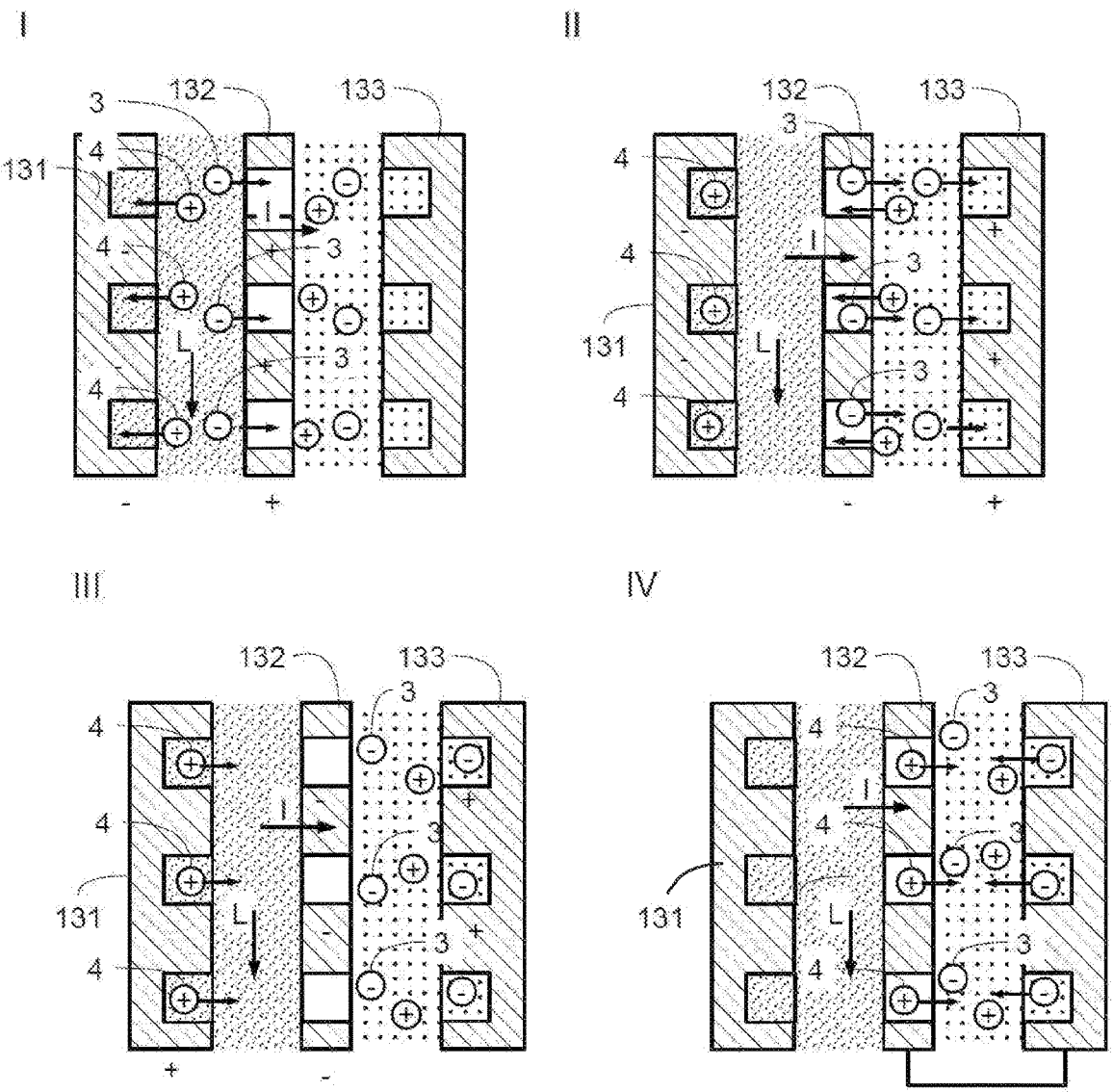
FIG. 3 schematically illustrates phases and a control sequence suitable for the example of FIG. 2.

As shown in FIGS. 2 and 3, at one or more side of the process channel 12 one or more of the electrodes 131-133 may be porous, for example be micro, mesoporous or nanoporous and therefore have a large internal surface. This enables the electrodes 131-133 to collect a large number of ions in the ionic double layers. For example, the separating electrode 132 may be porous which enables the separating electrode 132 to act as a membrane that absorbs ions from the process channel and releases them to the collector. Note that in phase-control circuitry 135 a floating connection is also possible. In this example, the separating electrode 132 is of a porous, ion permeable material and the ions flow from the process channel into the collector through the electrode. More specific, the separating electrode 132 separates the process channel from the collector.

By the term "ion permeable" material is meant a material which is configured to be permeable to ions (anions and cations), while at the same time having a high resistance to transport by bulk flow of liquid, which is known as advection. Thus, while ions can penetrate through or across the material, flows of liquid on either side of the material do not penetrate through or across the material. Thus, an ion permeable material is configured to be permeable to ions, and less permeable to liquid. Thus, the material has a high selectivity for ions compared to liquid, meaning that ions can penetrate through or across the material, whereas liquid cannot penetrate the material. The advection of a material, i.e. the resistance to liquid flows or the separating capacity, may be further improved by combination with an advection material. Examples of advection materials include dialysis membranes and/or hydrogels. Thus, advantageously, the ion permeable material is combined with an advection material. In an embodiment of the disclosure, the separating electrode further comprises an advection material.

However, depending on the specific implementation other geometries and configurations are possible. For example, several separate electrodes may be aligned along the process channel, spaced apart and embedded in a suitable porous material to allow the ions to pass through the spaces between the electrodes into the collector.

Electronic Control Circuit—Configurations or Phases

In this example, the device 1 contains at least three electrodes 131-133 which are subjected to alternating currents and/or voltages, more specific to square wave alternating currents and/or voltages and powered by a DC power source while the control circuit 134 switches the polarity. This allows the deionization to be powered by e.g. a battery or other simple DC power source. However, the electrodes may likewise be controlled in a different manner and for example be supplied with a sine wave current and/or voltage or a differently pulsed current and/or voltage. Although other control circuitry may be used as well, in the shown deionization device 1 of the present example, the electronic control circuit 134 comprises phase control circuitry 135 which controls the electric field to cycle through a set of predetermined phases in a predetermined order and more specifically which comprises switches which allow to connect or disconnect an electrode to a specific side of the power supply.

As illustrated in the examples, different phases and control sequences may be used depending on the specific implementation.

Preferably, the electronic control circuit is adapted to have different configurations or phases, such as at least four configurations or phases.

For example, the phases may be selected out of a group comprising: a first diluting phase in which the electric field drives a flow, which dilutes the liquid, of ions of a first type, out of anions or cations, towards the collector 14, and a second diluting phase in which the electric field drives a flow, which dilutes the liquid, of ions of an opposite type, opposite to the first ion type, towards the collector 14. In addition, there may be a first release phase in the group in which ions of the first type captured at a collector side electrode 132 are released into the collector 14 while opposing re-entry of the captured ions of the first type into the process channel 12. The sequence may also have a second release phase in which ions of the second type driven to and captured at the collector side electrode 132 are released into the collector 14 while opposing re-entry of the captured ions of the second type into the process channel 12.

FIG. 3 illustrates an example of a control sequence of the electrodes, and phases of the field. In this sequence, the group of phases used consists of the first and second diluting phase and the first and second release phase. The control circuit controls the field to cycle through the phases in the following order: first diluting phase, first release phase, second diluting phase, second phase. The table below illustrates the voltages applied to the electrodes in the different phases of the cycle, with V− indicating a negative potential, V+ a positive potential, S that electrodes are set to the same voltage e.g. short-circuited, and an empty field indicates a floating potential.

| electrode: | phase 1 | phase 2 | phase 3 | phase 4 |
|---|---|---|---|---|
| channel 131 | V− | | V+ | |
| separating 132 | V+ | V− | V− | S |
| collector 133 | | V+ | | S |

In this example, although other solvents and electrolytes may be used, the solvent is assumed to be water and the electrolyte NaCl. The salinity in experiments was typically around 6 mM NaCl per liter. The control sequence consists in this example of a series of pulses transmitted to the electrodes 131-133 by connecting the positive (+) and the negative (−) wire of an external DC voltage generator, to the different electrodes in the system. Such a connection can be performed fully electronically and can therefore be non-mechanical and in any case with less mechanical components than known deionization devices. The external voltage drives the movement of ions in the device. The voltage may be below the electrolysis voltage threshold of water and for instance be less than 1.23 V. In this example, a voltage of 1.2V was chosen during experiments. However, other voltages may be suitable as well, e.g. depending on the solution to be deionized.

In this example, during the first diluting phase, as illustrated in FIG. 3 (I), the ions of the opposite type flow in a direction opposite to the flow of ions of the first type. More specifically, the channel electrode 131 is set to V− and the separating electrode 132 to V+ while the collector electrode 133 is left floating. The negative electric charge in the channel electrode 131 causes cations to be sorbed there, and the positive electric charge of the separating electrode attracts anions which are sorbed there. Said differently, the generation of an electric field between channel electrode 131 and separating electrode induces opposite flows of ion types in the process channel, with cations flowing towards the channel electrodes and anions towards the separating electrodes. A part of the anions may enter the collector while another part retained in the separating electrode and both parts are no longer in the feed channel which results in the feed liquid being diluted from anions.

The collector 14 comprises a collector sorption material at a distance from the process channel 12. In the first release phase at least a part of the flow of the first type of ions is sorbed by the sorption material. During a desorption phase the collector 14 sorption material is desorbed and desorbed ions discharged through the electrolyte outlet 15. During the second diluting phase the ions of opposite type are sorbed at the collector 14. In this respect, the term "sorbed" as used herein generally comprises the physical binding of the ions to a material, such a binding may for example be one or more of the group consisting of: electrosorption, adsorption, absorption, ionic double layer.

In this example, during the first release phase, as illustrated in FIG. 3(II), the collector electrode 133 is set to V+, and the separating electrode 132 to V− while the channel electrode is left floating. The discharging of the separating electrode results in a release of the sorbed anions, yet these cannot move back into the process channel 12, as that would leave the process channel with an excess of negative charge which would break charge neutrality in the process channel. In addition, the collector electrode 133 attracts the anions. Thus, anions move into the collector channel 140, of which a part is sorbed in/on the collector electrode 133.

In FIG. 3, the process channel comprises a process channel sorption material at a side opposite to the collector 14. In the first diluting phase, the ions of the opposite type are driven away from the collector 14 and sorbed by the process channel 12 sorption material, and in the second diluting phase the ions of the opposite type are desorbed from the process channel sorption material.

In this example, during the second diluting phase, as illustrated in FIG. 3(III), the separating electrode is set to V− and the channel electrode 131 to V+. The collector electrode is left floating. This causes the cations sorbed at the channel electrode 131 to be released and to be sorbed in the separating electrode. The result is thus that less cations are in the feed channel and that the feed liquid is diluted from cations. As shown, in this example, in the second diluting phase the ions of the first type are driven to the collector side electrode 132 or in the collector 14 in the first diluting phase are retained there and the feed liquid thus remains diluted from the anions.

During the second release phase, as illustrated in FIG. 3(IV), the separating electrode and the collector electrode are discharged, for example by short-circuiting or reversing the voltage. The ions are thus released from the separating and collector electrodes 132,133 into the collector channel 140. The cations can only move into the collector channel 140, again due to charge neutrality. The initial depletion of ions from the process channel 12 and the release in the collector channel later induces a net transport of ions between the channels and accordingly a dilution of the feed liquid.

The duration of each of the phases may be chosen such that the amount of electric charge (integral of electric current over time) that flows to the electrodes is equal during each phase of the cycle. To compensate for a deviation from an ideal situation, due to losses inside the device, some compensation may be applied in this respect. The pulse sequence can be repeated continuously, while the feed liquid flows through the process channel. In this respect, the feed liquid may e.g. flow continuously or as a 'stop-flow'. The flow speed of the liquid may be set to a suitable value depending on the desired degree of deionization since the longer the propagation time in the process channel the more ions will be removed.

The length of each phase/pulse may be tuned to maximize the transport of the electrolyte during the cycles. Under ideal circumstances, the length of each of the phases may be chosen such that the amount of electric charge (integral of electric current) that flows through the wires is equal during each phase of the cycle, yet due to losses inside the device this might not be exactly the optimal strategy in practice. Once the ideal pulse sequence has been determined it can be repeated continuously, while the water flows through the device. One may also choose to use a so-called 'stop-flow', this has been tested to work as well on the current setup. The flow speed of the water can be adjusted according to the desired degree of desalination. The optimal pulse sequence and the associated pulse lengths have not yet been determined and may differ from the one that is described above. Also, it is expected that in the case of 4 or more electrodes (and subsequently 3 or more channels), a different pulse sequence will be favourable.

Figure 5:
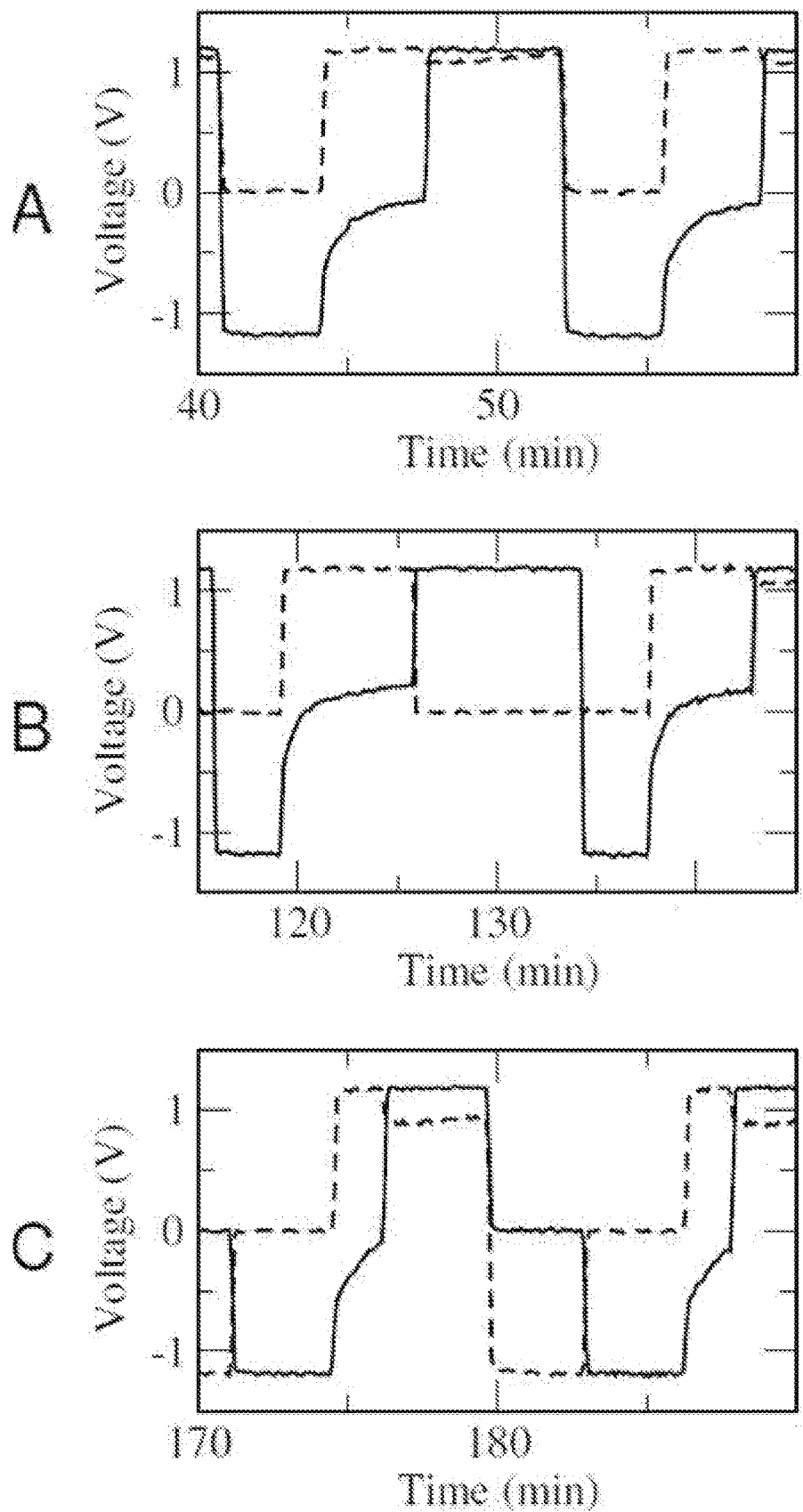
FIG. 5 schematically shows graphs of the electrode voltage as a function of time for alternative control sequences suitable for the example of FIG. 2.

As illustrated in FIG. 5, pulse sequences different from the example above may be used as well. FIG. 5 shows the development of the electrode voltage as a function of time. The tables below specify how the connection of the electrodes to the voltage source is made during each of the phases. In the FIG. the resulting measured voltage of the channel electrode 131 (solid line) and collector electrode 133 (dashed line) relative to the separating electrode 132 during the course of a few cycles is shown as a function of time.

FIG. 5 A is based on the following sequence:

| Electrode | phase 1 | phase 2 | phase 3 |
|---|---|---|---|
| channel 131 | V− | | V+ |
| separating 132 | V+ | V− | V− |
| collector 133 | V+ | V+ | |

FIG. 5 B is based on the following sequence:

| Electrode | phase 1 | phase 2 | phase 3 |
|---|---|---|---|
| channel 131 | V− | | V+ |
| separating 132 | V+ | V− | V− |
| collector 133 | V+ | V+ | V− |

FIG. 5 C is based on the following sequence:

| Electrode | phase 1 | phase 2 | phase 3 | phase 4 |
|---|---|---|---|---|
| channel 131 | V− | | V+ | V+ |
| separating 132 | V+ | V− | V− | V+ |
| collector 133 | V+ | V+ | | V− |

The first release phase of a cycle can be performed overlapping with a first diluting phase of a next cycle. For example, as illustrated in A and B in FIG. 5 and the tables, the process can be accelerated by combining the short-circuiting of the second release phase with the first diluting phase of the next cycle. For example, in the first diluting phase the electrodes may be set to the same voltage relative to the other electrodes, instead of being short circuited with the other electrodes floating.

As illustrated in C, additional phases may be used as well in a sequence, and the cycle be extended by adding additional electrode connections during the first diluting phase and the second release phase to aid a full discharge after each cycle, e.g. by setting in the first diluting phase the collector electrode 133 to a defined voltage instead of leaving the electrode floating or by setting in the second release phase the channel electrode 131 to a defined voltage instead of leaving the electrode floating.

Figure 4:
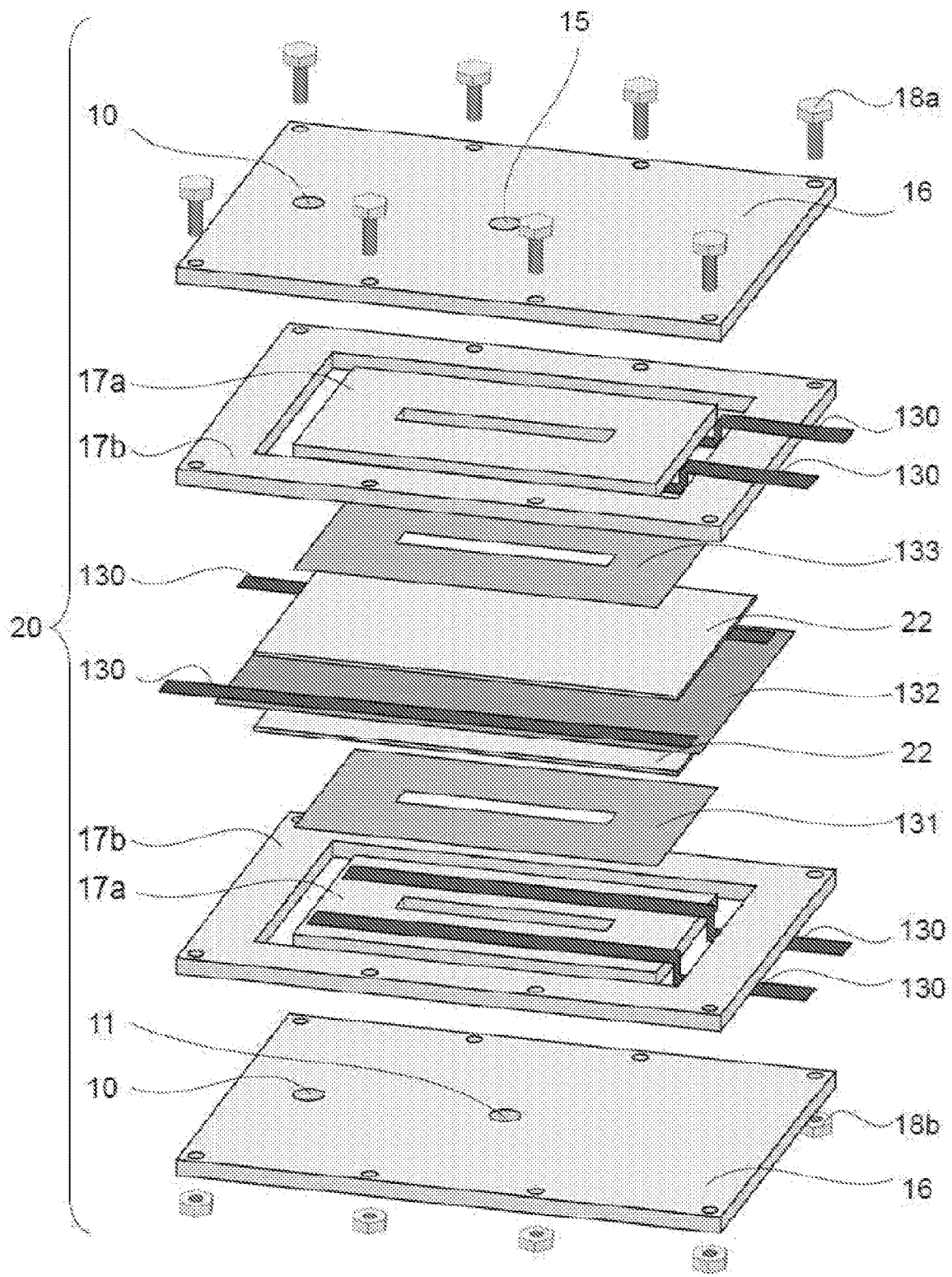
FIG. 4 shows a perspective, exploded view of another example of a deionization device.
Figure 6:
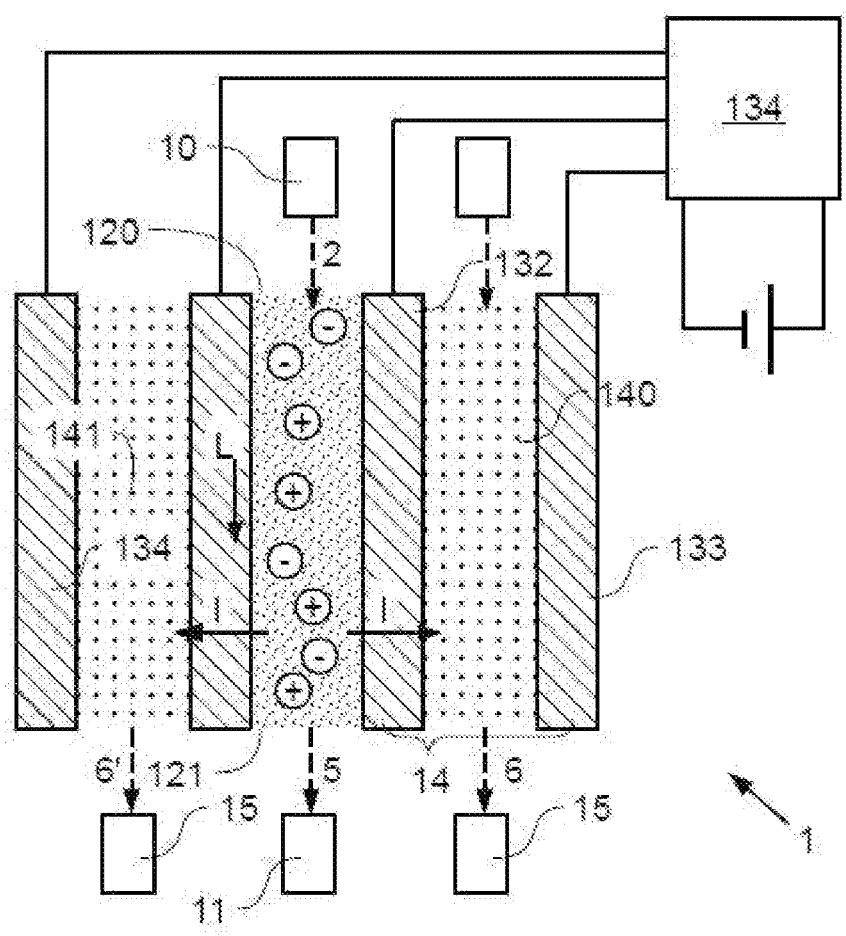
FIGS. 6-9 show schematic diagrams of further examples of deionization devices according to the present invention.

FIG. 4 schematically shows an example of a deionization device 1 which was used to perform the experiments illustrated in FIG. 6. However, it should be apparent that many alternative geometries and shapes are possible, such as for example circular instead of rectangular. The deionization device 1 comprises a stack 20 of patterned sheets clamped between top and bottom plates 16, which in the experiment where made of Perspex, although other materials may be suitable as well. The plates 16 are mechanically secured relative to each other and pressed towards each other to compress the stack, in this example with fasteners in the form of nuts and bolts 18a and 18b.

The device 1 is symmetrical and has a diluting side between bottom plate 16 and a, sheet shaped, separating electrode 132 and an electrolyte side between the separating electrode 132 and the top plate 16. As shown separating electrode 132 is provided with electrical contacts 130, e.g. from Ti foil or other suitable conductive material which are connectable to the power source and control circuit.

Between the plates 16 and the separating electrode 132, at both the top and bottom side of the stack 20, gaskets 17a, 17b are present which compress the other layers of the stack and separate the plates 16 from the electrode 132. In this example, gaskets 17a,17b are formed from a sheet-like material and may for example be made of (layers of) rubber and perspex combined. At each side, outer gasket 17b defines the inside of the deionization device and, together with the plates 16 closes the inside off in a liquid tight manner from the outside. The separating electrode 132 projects beyond the inner edge of the outer gasket 17b, such that when mounted the diluting side is sealed off from the electrolyte side in a liquid tight manner.

Inner gasket 17a is enclosed by the outer gasket 17b and spaced apart therefrom to define a channel through which, when in operation, a feed liquid stream is provided to the stack. As shown, inner gaskets 17a is provided with a slot to define a channel through which at the dilute side, a dilute liquid stream is discharged to the outlet 11 and at the electrolyte side an electrolyte or concentrate liquid stream flows in operation. In this example, the channels 12 are connected to feed inlet 10 and liquid and electrolyte outlets 11,15.

The stack comprises, in a direction from the plate 16 towards the separating electrode 132, a sheet-shaped electrode 131,133 which is provided with a slot corresponding to the slot in the inner gasket 17a and which is spaced apart from the separating electrode 132 by a spacer 22 that creates a gap between the electrodes.

It is found that for the electrodes 131-133 a sheet like material with bulk porosity of at least 15%, such as about 20%, bulk porosity results in good flow characteristics. It is further found that a material with nano and/or meso porosity yields good sorption of ions, in particular of salts like NaCl. During experiments, the electrodes 131-133 were made of nanofoam carbon paper with a thickness of 0.2 mm. This has a very high internal surface area, low electric resistance and high relative capacitance. However, other electrode materials may be used as well.

The material of the spacer 22 may for example be layers of polyester mat or other material that allows a liquid flow between the electrodes 131,132 and 132,133. Thus, at both sides of the separating electrode 132, a liquid flow channel is created by the spacer. Like the separating electrode 132, the electrodes 131,133 are provided with electrical contacts 130, e.g. from Ti foil or other suitable conductive material which are connectable to the power source 19 and control circuit 130.

In this example, in operation, the feed liquid, e.g. saline water, is received through a hole in the top as well as the bottom plate 16 which forms feed inlet 10 and enters the channel between the gaskets 17a,17b. The feed liquid will flow through the channel to the separating electrode and then be forced by separating electrode and other electrode to flow through the spacer 22. The feed liquid then flows towards the hole or slot in the top and bottom electrode 131,133. This hole enables the liquid to be collected and transported out of the device though the electrolyte outlet 15 for the concentrated stream, and the liquid outlet 11 for the diluted liquid stream. The transport of ions between the dilute side and the electrolyte side occurs while the feed liquid is in the spacer 22 between the electrodes.

A suitable duration of the pulses may be determined experimentally, and be set in dependence to the electrolyte, residence time in the process channel, dimensions of the process channel and permeability of the electrodes. Although depending on the specific implementation, a suitable time is believed to be several minutes per phase. For instance, in the example of FIG. 4, a characteristic time scale in the order of a minute per phase was used for a thickness of the separating electrode of 0.2 mm and an ionic self-diffusion coefficient of approximately $10^{-9}$ m$^2$/s.

During experiments it has been observed that relatively thick spacers (1.0 mm) yield a higher salinity difference between the output channels compared to a small gap (0.1 mm). Without wishing to be bound to theory, this is believed to be caused the flow speed of the water in the spacer channel being lower when the same total flow rate remains the same. A relatively wide process channel, such as with a diameter of at least 0.5 mm e.g. 1 mm or larger may thus increase the effectiveness of the device 1. It will be apparent, that the feed liquid can remain in the process channel for multiple desalination cycles and that the flow rate can be adjusted to the desired concentration of the electrolyte in the dilute liquid. This permits the use of wider flow channels without limiting the maximum desalination capacity, while also yielding less resistance for the liquid and hence allows to reduce the energy consumption.

One may choose to feed the process channel and the collector with the same liquid but the input streams may also differ from each other in composition. The collector channel 140 can for example connected at an upstream, in the concentrate flow direction, side to a separate inlet 21 for providing a liquid different from the feed liquid 2. This allows to transfer the electrolyte from a first type of solvent to another type of solvent. For example, this can be used to transport salt from a food product in the process channel (e.g. whey or soy sauce) to water in the collector channel 140. Alternatively or additionally, the collector channel 140 can be connected at an upstream side thereof to the feed inlet 10 and thus receive the feed liquid.

In the deionization device 1 of FIG. 6, the collector 14 comprises a first collector channel 140 and a second collector channel 141. The first collector channel 140 extends alongside the process channel 12 at a first side of the process channel 12 while the second collector channel 141 extends alongside the process channel 12 at a second side of the process channel 12, opposite to the first side. This allows to remove in a single diluting phase both the first and second type of ions and accordingly increase the diluting speed and accordingly the cycle time.

The shown example comprises more than three electrodes, each collector channel having its own electrode 133,134 facing an electrode 131,132 of the process channel. Thus, the electrode 134 corresponds to a second separation electrode. This setup may be used to apply pulse sequences that example, as follows:

| electrode | phase 1 | phase 2 | phase 3 | phase 4 |
|---|---|---|---|---|
| second collector 134 | | V+ | | S |
| channel 131 | V− | V− | V− | S |
| separating 132 | V+ | V2+ | V+ | S |
| first collector 133 | | V2− | | S |

It is noted that V2+ and V2− correspond to a second voltage difference that may be generated by a second power source. "S" relates to a short.

Thus, in the first diluting phase the anions are diluted towards a first collector channel, while the cations are diluted towards the second collector channel. In the second diluting phase the anions are diluted towards the second collector channel, while the cations are diluted towards the first collector channel. Similarly, in the first release phase the anions sorbed at electrode 132 are released and attracted into the first collector channel, while the cations sorbed at electrode 131 are released and attracted into the second collector channel.

Figure 7:
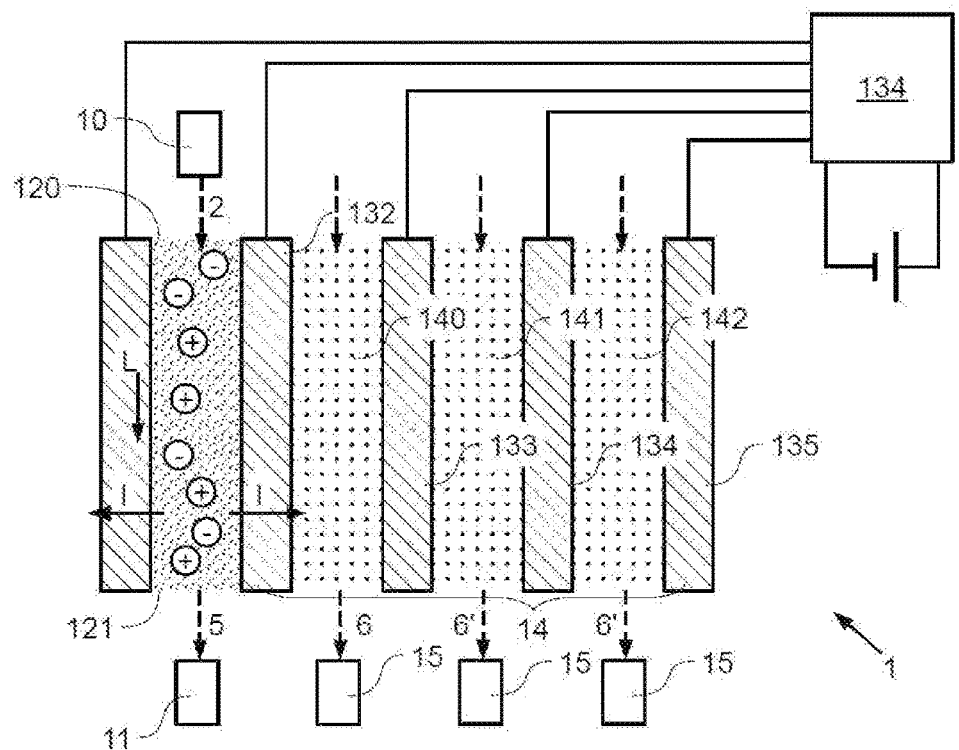

In the deionization device 1 of FIG. 7, the collector 14 comprises at a first side of the process channel 12 a plurality of collector channels 140-142 extending alongside the process channel 12. The successive collector channels 140-142 may be in the ion flow direction separated from each other by a separation permeable to the ions, in this example formed by permeable electrodes 133-134-135. Thus electrodes 134 and 135 correspond to second separation electrodes. In operation a concentration of electrolyte ions differs in the ion flow direction between the collector channels 140-142.

In the deionization device 1 of FIG. 7, the field generator 13 is arranged to generate a field which in operation drives ions of a selected type to distribute over the collector channels 140-142 according to predetermined concentration profile. For example, ion concentration differences between the output streams may be obtained. A large gradient can be attained via smaller gradients between multiple neighbouring channels in this way. Although in the shown example all collector channels are connected to a respective outlet 6,6' and to an inlet, not all channels need to have an outlet and for example some may be completely closed off, just to create a desired gradient.

Figure 8:
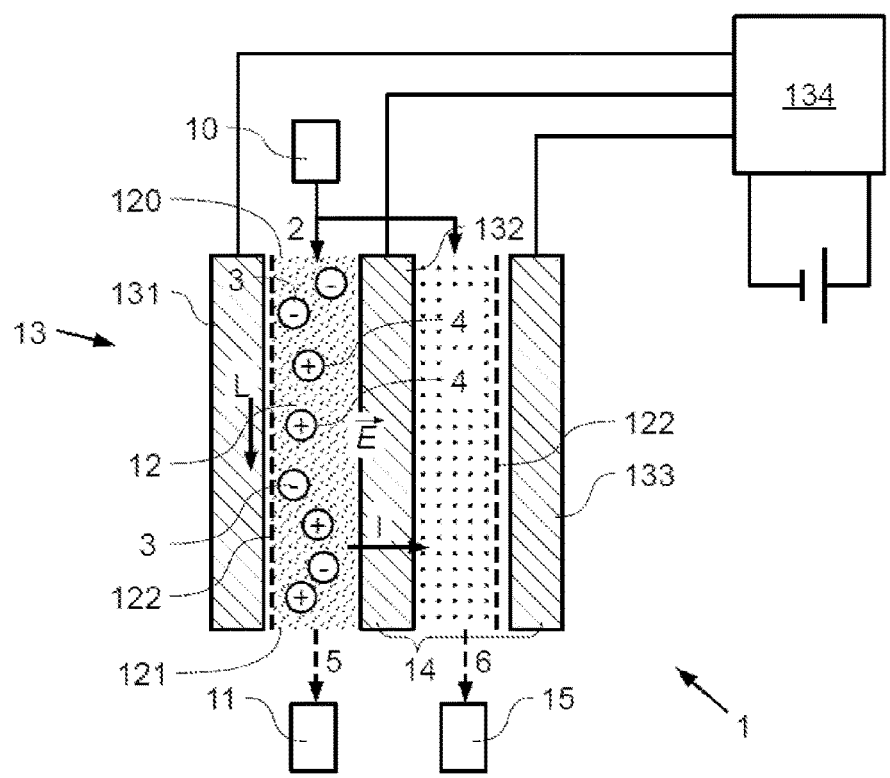

As shown in FIG. 8, out of the electrodes an electrode 131 at a side of the process channel 12 opposite to the collector 14 is at least partially shielded from the process channel 12 by an ion exchange membrane 122. Since the pulse sequences can be chosen such that the channel side electrode 132 and the electrode 131 only take one polarity, this allows to increase their sorption capacity. An anion-exchange membrane forbids the electrodes to expel (residual) positive into the channel upon application of a positive voltage. The latter leads to more absorption of negative ions. The same is true for positive ions in the case of cation-exchange membranes.

Figure 9:
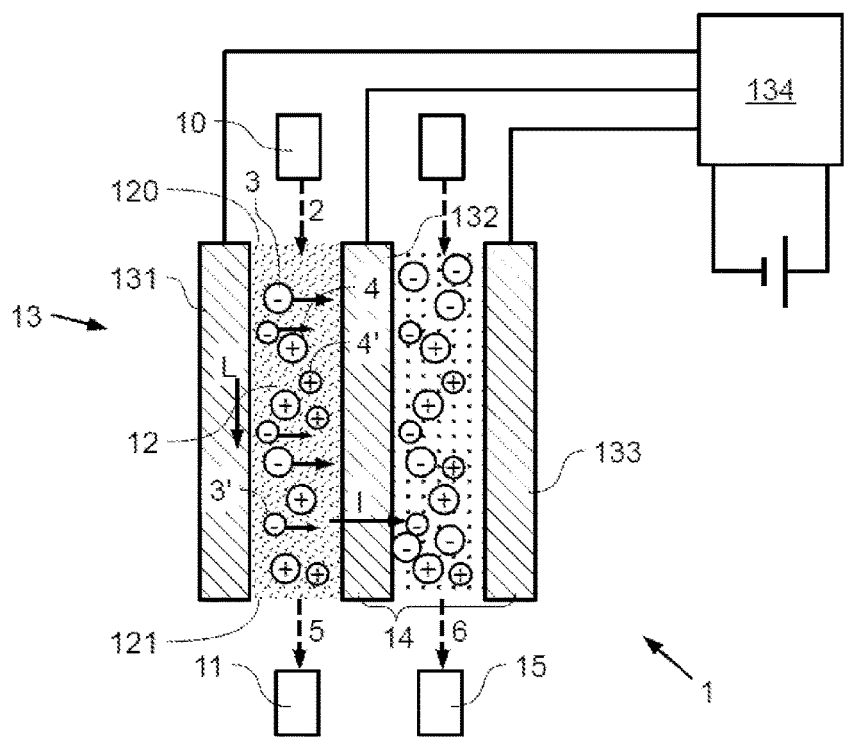
Figure 10:
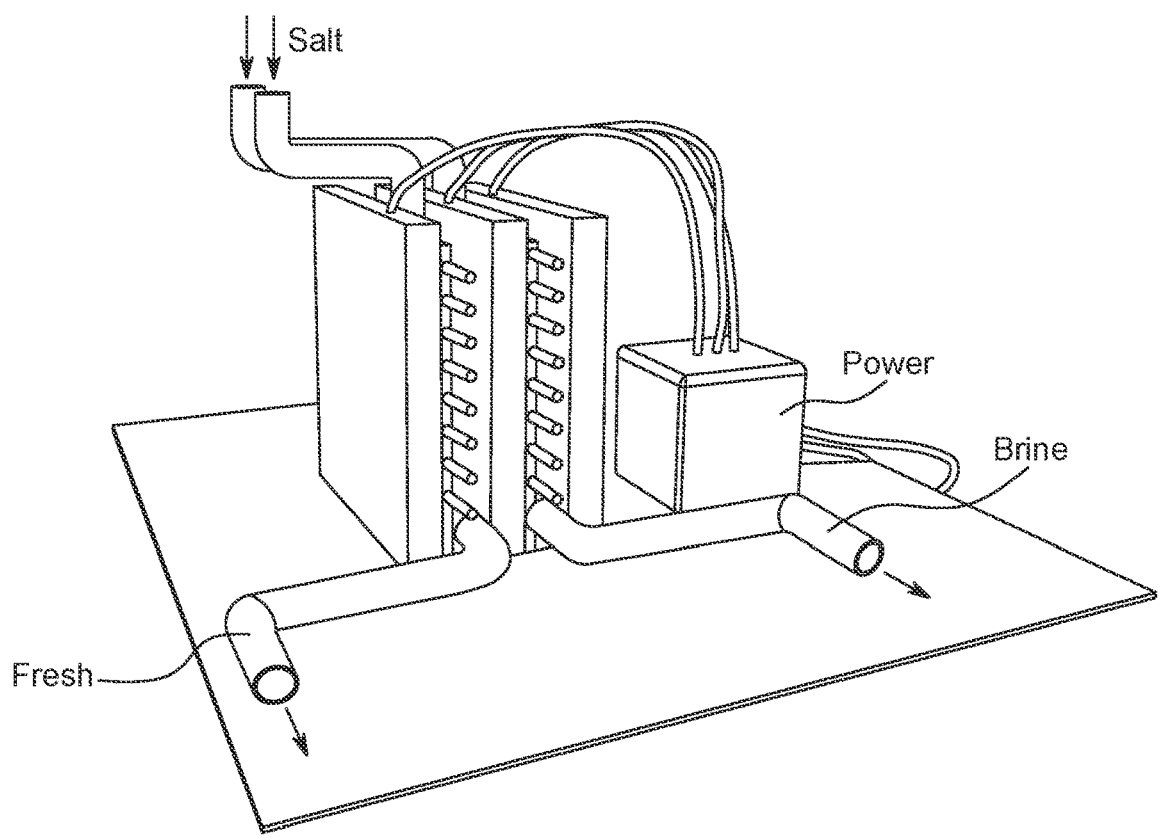
FIG. 10 schematically shows a perspective view of an example of an apparatus in which a deionization device according to the present invention is used.

In the deionization device 1 of FIG. 9, the ions of the selected type are driven to concentrate in a selected channel out of the collector channels 140-142. Separation of ionic species with different charges by exploiting a difference in affinity for different ion species of the electrodes (i.e. extraction of valuable metals). In this example there are different anionic species, of which one is more susceptible to may be transported, as indicated by length of the arrows in FIG. 9. For example, the ions may have a difference in charge or self-diffusion. The result is an output stream of the collector that has a relatively high fraction of anionic species, whilst the process channel produces a high fraction of the second anionic species. This mechanism would be the same for mixtures of different cations. Accordingly, the device can be used to separate different types of electrolytes from a solution.

The deionization device 1 may be used in an apparatus which processes the feed liquid 2. For example deionization, i.e. the separation of electrolytes from liquids in which these are dissolved, can be used for aqueous, or non-aqueous, liquids in a wide range of applications, such as: desalination of seawater, water softening, removal of toxic substances from drinking water, selective extraction of critical metals and valuable elements, like Li, from aqueous solutions or separation of compounds using electrolytes in aqueous or non-aqueous (e.g. organic) solvents during chemical or pharmaceutical processing, just to name a few.

For example, the deionization device 1 may be connected with the feed inlet 10 to processing equipment in a processing flow direction upstream of the deionization device 1 which performs processes from which feed liquid 2 results, and outputs the feed liquid 2 to the deionization device 1. In addition, or alternatively, the deionization device 1 may be connected with the liquid outlet 11 and/or the electrolyte outlet 15 to processing equipment in a processing flow direction downstream of the deionization device 1 which performs processes with the discharged substances. For example, the deionization device 1 may be part of a chemical or pharmaceutical plant and be used in a chemical or drug manufacturing process flow, or be part of a purification plant which purifies the liquid or the electrolytes, just to name a few.

The present desalination apparatus may be used for saline water, such as seawater. The shown desalination apparatus, comprises a deionization device 1 such as one of the examples described. The feed inlet 10 of the deionization device 1 is connected to a source of saline water. In this example the feed inlet 10 is connected to filtration equipment which in a water processing direction is downstream of a water inlet of the apparatus. The filtration equipment and the dilute outlet is connected to purification equipment.

The present apparatus may be used as a decontamination apparatus for decontaminating liquids contaminated with toxic or radioactive electrolytes. For example, the apparatus may remove radioactive ions from water in nuclear power plants or toxic chemicals from tap water. The shown decontamination apparatus, comprises a deionization device 1 such as one of the examples described.

The present apparatus may be used as an electrolytic recovery apparatus for recovering metals from a liquid. The shown electrolytic recovery apparatus, comprises a deionization device 1 such as one of the examples described.

FIGS. 6-9 show a method of at least partially deionizing a feed liquid 2 in which an electrolyte is dissolved. Such a method may be performed with a deionization device 1 as described above or in another manner. As illustrated, the method comprises receiving the feed liquid 2 at a feed inlet 10. The feed liquid 2 may be passed through a process channel 12 connected at an upstream side, in a liquid flow direction of the feed liquid 2, to the feed inlet 10. In the process channel 12 the feed liquid 2 is diluted, i.e. anions and cations of the selected dissolved electrolytes are removed therefrom to reduce the concentration of one, or more, selected electrolytes in the liquid. The resulting diluted liquid may be discharged at a dilute outlet connected to the process channel 12.

In this example, to remove the anions and cations, an electric and/or magnetic field may be generated in the process channel 12 to obtain a diluted liquid with a lower concentration of ions of the electrolyte than the feed liquid 2. As shown, the field drives anions and cations of the electrolyte in an ion flow direction which differs from the liquid flow direction and which is the same for both anions and cations.

The anions and cations driven by the field can be collected at a collector 14 located downstream, in the ion flow direction, of the process channel 12. The collected anions and cations may be discharged separately from the diluted liquid at an electrolyte outlet 15 connected to the collector 14.

The ions, and other substances, discharged at the electrolyte outlet 15 may be processed further downstream of that outlet, for example to obtain the separated electrolyte in a desired degree of purity or to perform chemical processing with the electrolyte and e.g. be supplied to other equipment of a processing plant.

The dilute liquid discharged at the liquid outlet 11 may be processed further downstream of that outlet, for example to obtain the liquid in a desired degree of purity or to perform chemical processing with the liquid and e.g. be supplied to other equipment of a processing plant. For example, the liquid may be water and be processed further to a degree of purity suitable for human or animal consumption, to a pharmaceutically acceptable level, or to a degree of purity with only trace contaminants in the range of parts per billion (ppb) or parts per trillion (ppt) just to name a few examples.

In the foregoing specification, the invention has been described with reference to specific examples of embodiments of the invention. It will, however, be evident that various modifications and changes may be made therein without departing from the broader scope of the invention as set forth in the appended claims.

For instance, although in the shown example, the field is the same in the liquid flow direction, an arrangement of separately controlled electrode sets may be placed along the processing channel. This allows to control the field generated by the separate electrodes and thus have a field which varies in the liquid flow direction, for example at the same point in time the field may be different in phase at different positions in the liquid flow direction. This enables a (semi-)continuous operation of the device. For example, in the processing channel, the field may change in phase in the liquid flow direction, in the same order as the selected cycle and at a given point in time all phases may be present in the channel. This enables removing the desired electrolytes to the set degree over the length of the channel in a continuous manner. For instance, each set may cycle through the entire set of phases, but for instance each set may be shifted a phase relatively to the next, in the flow direction, set. E.g. when the most upstream set is in phase n, the second most upstream set may be in phase n±1 of a cycle, the third most upstream set in phase (n±1)±1, etc. in which n is a positive, natural number.

Furthermore, stored capacitive energy that is released during some phases, for example in a short-circuiting phase, may be harvested and used in other phases, or may be used in a second deionization device that runs at the same time but is shifted in phase.

Furthermore, although in the described experiments water was desalinated, the liquid may be another liquid. For instance the liquid may be one selected from the group: water, aqueous solvents, non-aqueous solvent. Also, the electrolyte is not restricted to a salt and may comprise a compound selected from the group consisting of: acid, salt, base. The electrolyte may be a compound selected from the group consisting of: chloride salts, hypoclorite-salts, radio-active electrolytes, metal salts. The anions and cations may for example may be selected from the group consisting of: Na, K, Ca, Cs, F, Cl, Br, I, ClO. The anions and cations may also be small, charged impurities, such as nanoparticles, quantum dots, colloidal particles, organic molecules, minerals, biological molecules, small proteins, DNA, microorganisms, cells, and viruses.

Also, for example, it will be apparent that the pulse sequence and the associated pulse lengths may differ from the examples described above.

Furthermore, the concentration of electrolytes dissolved in the feed liquid may be any suitable concentration. For example, the feed liquid may be water with a salinity of more than 0.05%, such as more than 3%, for example >5%. The salinity may be below 5%, such as below 3% for instance.

Figure 11:
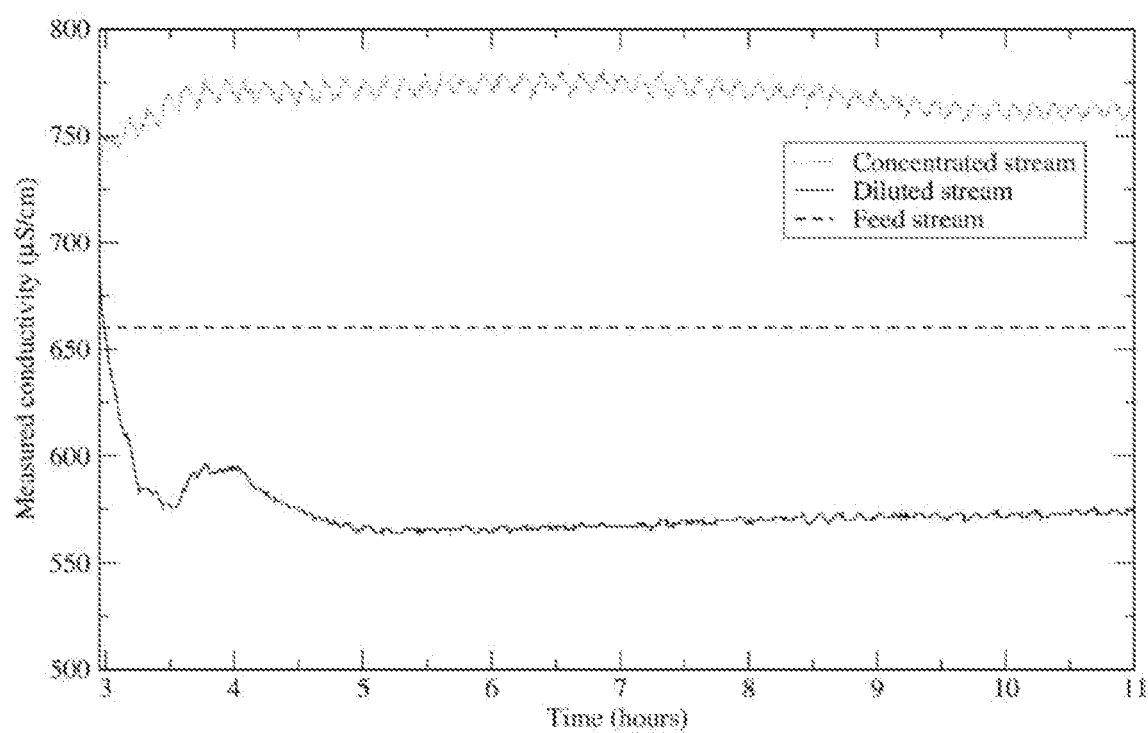
FIG. 11 shows experimental results.

FIG. 11 shows experimental results. Therein a desalinization cyclus, such as represented in table 1, is performed. At around 3 hours the cycle was initiated and continued to about 11 hours (horizontal axis). From the figure it is clear that the conductivity, which is a measure for amount of ions dissolved, dropped quickly from about 650 µS/cm to about 570 µS/cm, hence ions are removed from the solution. At the same time the conductivity of the concentrated stream rapidly increased from about 650 µS/cm to about 770 µS/cm, hence ions are concentrated in this stream.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Also, the use of introductory phrases such as "at least one" and "one or more" in the claims may be not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements.

The mere fact that certain measures are recited in mutually different claims does not indicate that a combination of these measures cannot be used to advantage.

LIST OF REFERENCE NUMBERS AND SYMBOLS

1—deionization device
2—feed liquid
3,4—ions of electrolytes
5—diluted liquid
6—concentrate liquid
10—feed inlet
11—liquid outlet
12—process channel
13—field generator
14—collector
15—electrolyte outlet
16—plates
17a,17b—gaskets
18a,18b—fastener
19—power source
20—stack
21—separate inlet
22—spacer
120—upstream side
121—downstream side
122—ion exchange membrane
130—electric contacts
131—process channel electrode
132—separating electrode
133—collector electrode
134—electronic control circuit or second separation electrode
135—phase control circuitry or second separation electrode
140—first collector channel
141—second collector channel
142—additional collector channels
200—electrolyte extraction apparatus
300—desalination apparatus
400—decontamination apparatus
$\vec{E}$—electro-magnetic field
L—liquid flow direction
I—ion flow direction
Items
The presently disclosed may be described in further detail with reference to the following items.
1. A deionization device, for at least partially deionizing a feed liquid in
which at least one electrolyte is dissolved, the device comprising:
a feed inlet for receiving the feed liquid;
a dilute outlet for discharging a diluted liquid with a lower concentration of ions of the electrolyte than the feed liquid; and
a process channel connected at an upstream side, in a liquid flow direction of the feed liquid, to the feed inlet and at a downstream side to the dilute outlet;
a field generator for generating an electric and/or magnetic field in the process channel which drives anions and cations of said electrolyte in an ion flow direction which differs from the liquid flow direction and which is the same for both anions and cations;
a collector for collecting the anions and cations driven by the field, which collector is located downstream, in the ion flow direction, of the process channel; and an electrolyte outlet connected to the collector, for discharging the collected anions and cations separately from the diluted liquid.

2. A device according to embodiment 1, wherein the field is an electric field
and the field generator comprises:
electric contacts connectable to an electrical power source;
electrodes at opposite sides of the process channel which face each other, for generating the electric field therebetween, the electrodes being connected to the electrical contacts for receiving
electric power from the power source;
an electronic control circuit to control the electric field, the control circuit being connected to the electric contacts and the electrodes, for controlling parameters of the electrodes which regulate the electric field.

3. A device according to the preceding embodiment, wherein out of said electrodes an electrode
at a side of the process channel opposite to the collector is at least partially shielded from the process channel by an ion exchange membrane.

4. A device according to the preceding embodiment, wherein at at least one side of the process channel the electrode is porous.

5. A device according to embodiment 2 or 4, wherein the electronic control circuit comprises
phase control circuitry which controls the electric field to cycle through a set of predetermined phases in a predetermined order, the phases being selected out of a group comprising:
a first diluting phase in which the electric field drives a flow, which dilutes the liquid, of ions of a first type, out of anions or cations, towards the collector;
a second diluting phase in which the electric field drives a flow, which dilutes the liquid, of ions of an opposite type, opposite to the first ion type, towards the collector.

6. A device according to embodiment 5, wherein the group comprises:
a first release phase for releasing ions of the first type captured at a collector side electrode into the collector while opposing re-entry of the captured ions of the first type into the process channel; and
a second phase for releasing ions of the second type driven to and captured at the collector side electrode into the collector while opposing re-entry of the captured ions of the second type into the process channel.

7. A device in according to embodiment 5 or 6, wherein in the second diluting phase the ions of the first type driven thereto in the first diluting phase are retained at the collector side electrode or the collector.

8. A device in according to any one of embodiments 5-7, wherein in the first diluting phase the ions of the opposite type flow in a direction opposite to the flow of ions of the first type.

9. A device according to any one of embodiments 5-8, wherein the group consists of the first, second, third and second phase and the control circuit controls the field to cycle through the phases in the following order: first diluting phase, first release phase, second diluting phase, second phase.

10. A device according to embodiment 9, wherein the first release phase of a cycle is performed overlapping with a first diluting phase of a next cycle.

11. A device according to any one of the preceding embodiments, wherein the collector comprises a collector sorption material at a distance from the process channel, and wherein in the first release phase at least a part of the flow of the first type of ions is sorbed by the sorption material.

12. A device as embodiment in embodiment 11, wherein during a desorption phase the collector sorption material is desorbed and desorbed ions discharged through the electrolyte outlet.

13. A device according to any one of embodiments 11-12, wherein during the second diluting phase the ions of opposite type are sorbed at the collector.

14. A device according to any one of embodiments 11-13, wherein:
the process channel comprises a process channel sorption material at a side opposite to the collector,
in the first diluting phase the ions of the opposite type are driven away from the collector and sorbed by the process channel sorption material, and
in the second diluting phase the ions of the opposite type are desorbed from the process channel sorption material.

15. A device according to any one of the preceding embodiments, comprising:
a separation between the process channel and the collector, which separation has a higher permeability for the anions and cations than for the liquid and allows the anions and cations to pass from a process channel side of the separation to a collector side of the separation.

16. A device according to embodiment 15, wherein:
the collector comprises a collector channel connected at a downstream, in a concentrate flow direction, side to the electrolyte outlet; and
the separation separates the collector channel from the process channel.

17. A device according to embodiment 16, wherein the collector channel is connected at an upstream, in the concentrate flow direction, side to a separate inlet for providing a liquid different from the feed liquid.

18. A device according to embodiment 16, wherein the collector channel is connected at an upstream side to the feed inlet.

19. A device according to any one of the embodiments 16-18, wherein the collector comprises:
a first collector channel extending alongside the process channel at a first side of the process channel; and
a second collector channel extending alongside the process channel at a second side of the process channel.

20. A device according to any one of the embodiments 16-19, wherein the collector comprises at a first side of the process channel a plurality of collector channels extending alongside the process channel, the collector channels being in the ion flow direction separated from each other by a separation permeable to the ions.

21. A device according to embodiment 20, wherein in operation a concentration of electrolyte ions differs in the ion flow direction between the collector channels.

22. A device according to embodiment 21, wherein the field generator is arranged to generate a field which in operation drives ions of a selected type to distribute over the collector channels according to predetermined concentration profile 23. A device according to embodiment 22, wherein the ions of the selected type are driven to concentrate in a selected channel out of the collector channels.

24. A device according to any one of the preceding embodiments, wherein the field generator comprises:
a first set of electrodes for generating said electric field in the process channel, and
a second set of electrodes for generating an electric field in the collector which drives anions and/or cations in a direction away from the process channel.

25. A device according to any one of the preceding embodiments, wherein the field varies in time in at least one of the group consisting of: polarity, strength, direction.
26. A device according to any one of the preceding embodiments, wherein the separation comprises an electrode.
27. A device according to any one of the preceding embodiments, wherein the liquid is one selected from the group: water, aqueous solvents, non-aqueous solvent.
28. A device according to any one of the preceding embodiments, wherein the electrolyte comprises a compound selected from the group consisting of: acid, salt, base.
29. A device according to embodiment 28, wherein the electrolyte comprises a compound selected from the group consisting of: chloride salts, hypoclorite-salts, radioactive electrolytes, metal salts.
30. A device according to embodiment 29, wherein the anions and cations comprises a compound selected from the group consisting of: Na, K, Ca, Cs, F, Cl, Br, I, ClO.
31. An apparatus, comprising a device according to any one of the preceding embodiments.
32. An apparatus according to embodiment 31, wherein the apparatus is an electrolyte extraction
apparatus for individually separating different types of electrolytes from a liquid.
33. An apparatus according to embodiment 31, wherein the apparatus is a desalination apparatus for seawater, comprising a device according to any one of embodiments 1-30.
34. An apparatus according to embodiment 31, wherein the apparatus is a decontamination apparatus for decontaminating liquids contaminated with toxic or radioactive electrolytes,
comprising a device according to any one of embodiments 1-30.
35. An apparatus according to embodiment 31, wherein the apparatus is an electrolytic recovery apparatus for recovering metals from a liquid, comprising a device according to any one of embodiments 1-30.
36. A method of at least partially deionizing a feed liquid in which an electrolyte is dissolved, comprising:
receiving the feed liquid at a feed inlet; and
passing the feed liquid through a process channel connected at an upstream side, in a liquid flow direction of the feed liquid, to the feed inlet;
generating an electric and/or magnetic field in the process channel to obtain a diluted liquid with a lower concentration of ions of the electrolyte than the feed liquid, the field driving anions and cations of said electrolyte in an ion flow direction which differs from the liquid flow direction and which is the same for both anions and cations,
collecting the anions and cations driven by the field at a collector located downstream, in the ion flow direction, of the process channel;
discharging the diluted liquid at a dilute outlet connected to the process channel;
and discharging the collected anions and cations separately from the diluted liquid at an electrolyte outlet connected to the collector.
37. A method according to embodiment 36, comprising further processing the ions discharged at the electrolyte outlet, for example to obtain the separated electrolyte in a desired degree of purity.
38. A method according to embodiment 36 or 37, comprising further processing the treated liquid, for example to obtain a desired degree of purity thereof.
39. A method according to embodiment 38, wherein the treated liquid is water and the desired degree is that of drinking water.
40. A method according to any one of embodiments 36-39, performed with a device according to any one of embodiments 1-30.

The invention claimed is:
1. A deionization device for at least partially deionizing a feed liquid in which at least one electrolyte is dissolved, the device comprising:
   at least one process channel having a feed inlet configured for receiving the feed liquid, and a feed outlet configured for discharging the deionized feed liquid, such that the at least one process channel comprises a feed liquid flow;
   at least one collector channel configured for collecting anions and cations separated from the feed liquid;
   an electrolyte outlet configured for discharging the collected anions and cations;
   at least one channel electrode, at least one separating electrode, and at least one collector electrode,
   wherein the at least one channel electrode and the at least one separating electrode are placed at opposite sides of the at least one process channel, and wherein the at least one separating electrode and the at least one collector electrode are placed at opposite sides of the at least one collector channell; and
   a field generator configured to generate a first electrical field and a second electrical field,
   wherein the first electrical field is generated between the at least one channel electrode and the at least one separating electrode, and the second electrical field is generated between the at least one separating electrode and the at least one collector electrode,
   wherein the first and second electrical fields are configured to generate an ion flow from the at least one process channel to the at least one collector channel, and wherein the ion flow direction is the same for anions and cations, and
   wherein the field generator is an electrical generator comprising an electrical power source and an electrical control circuit,
   wherein the electrical control circuit is configured to control the first electrical field and second electrical field, and to switch at least one of polarity, strength, or direction of at least one of the first and second electrical fields, and
   wherein the electrical control circuit is configured to sequentially cycle through four phases:
   a first phase, wherein the first and second electrical fields are adapted for driving ions of a first charge from the at least one process channel towards adsorption at the at least one separating electrode,
   a second phase, wherein the first and second electrical fields are adapted for driving ions of the opposite charge from the at least one process channel and towards adsorption at the at least one separating electrode,
   a third phase, wherein the first and second electrical fields are adapted for driving ions of the first charge adsorbed at the at least one separating electrode towards the at least one collector channel, and
   a fourth phase, wherein the first and second electrical fields are adapted for driving the ions of the opposite charge adsorbed at the at least one separating electrode towards the at least one collector channel.
2. The device according to claim 1, wherein the electrodes are porous and have a bulk porosity of at least 15%, such that they are configured for ion absorption or ion retention.

3. The device according to claim 1, wherein the electrodes are microporous, and/or mesoporous, and/or nanoporous.

4. The device according to claim 1, wherein the electrodes comprise nanofoam carbon paper and/or graphene.

5. The device according to claim 1, wherein the electrodes comprise open porosity, whereby the electrodes are permeable.

6. The device according to claim 1, wherein the at least one separating electrode comprises an ion permeable material.

7. The device according to claim 1, wherein the at least one separating electrode separates the at least one process channel from the at least one collector channel.

8. The device according to claim 1, wherein the at least one collector channel extend alongside the at least one process channel.

9. The device according to claim 1, comprising two or more collector channels extending alongside the at least one process channel.

10. The device according to claim 9, wherein the two or more collector channels are separated by one or more second separating electrodes.

11. The device according to claim 9, wherein each of the collector channels are configured for collecting a predetermined type of ions and/or ions concentrations.

12. The device according to claim 1, wherein the at least one collector channel comprises a second liquid flow, where the second liquid is different from the feed liquid.

13. The device according to claim 12, wherein the feed liquid or the second liquid is selected from the group of: water, fresh water, brine water, seawater, aqueous solvents, non-aqueous solvents.

14. The device according to claim 1, wherein the electrolyte of the feed liquid comprises a compound selected from the group of: acid, salt, base, chloride salts, hypochlorite-salts, radioactive electrolytes, metal salts, or wherein the anions and cations are selected from the group of: Na, K, Ca, Cs, F, Cl, Br, I, ClO.

15. The device according to claim 1, wherein the deionized feed liquid is drinking water.

16. The device according to claim 1, wherein the electrical control circuit is adapted to have four configurations or phases:
a first diluting phase, wherein the first and second electrical fields are adapted for driving ions of a first charge from the at least one process channel towards adsorption at the at least one separating electrode,
a second diluting phase, wherein the first and second electrical fields are adapted for driving ions of the opposite charge from the at least one process channel and towards adsorption at the at least one separating electrode,
a first release phase, wherein the first and second electrical fields are adapted for releasing ions of the first charge adsorbed at the at least one separating electrode towards the at least one collector channel, and
a second release phase, wherein the first and second electrical fields are adapted for releasing the ions of the opposite charge adsorbed at the at least one separating electrode towards the at least one collector channel.

17. The device according to claim 16, wherein the electrical control circuit is adapted to sequentially cycle through the phases in the order of: first diluting phase, first release phase, second diluting phase, second release phase.

18. The device according to claim 1, wherein the at least one collector electrode comprises two or more collector electrodes.

19. The device according to claim 1, wherein the electrical control circuitry comprises switches configured to connect or disconnect at least one channel electrode, at least one separating electrode, or at least one collector electrode to a specific side of the power supply.

20. A method for partially deionizing a feed liquid in which an electrolyte is dissolved, comprising the steps of:
providing the device according to claim 1,
receiving the feed liquid at the feed inlet,
passing the feed liquid through the at least one process channel,
- generating an electric and/or magnetic field in the at least one process channel, whereby the anions and cations of the electrolyte are driven in an ion flow direction which differs from the feed liquid flow direction and which is the same for both anions and cations,
collecting the anions and cations at the at least one collector channel,
discharging the deionized feed liquid at the feed outlet, and
discharging the collected anions and cations at the electrolyte outlet.

* * * * *